United States Patent Office 3,437,611
Patented Apr. 8, 1969

3,437,611
MATERIAL AND METHOD FOR
TREATING CONCRETE
Wilmot F. Macklin, St. Paul, Minn. (% TK Products, Inc., 5125 Hanson Court, Minneapolis, Minn. 55429)
No Drawing. Continuation-in-part of application Ser. No. 407,916, Oct. 30, 1964. This application May 26, 1966, Ser. No. 553,042
Int. Cl. C08c 7/06
U.S. Cl. 260—3.3   1 Claim

ABSTRACT OF THE DISCLOSURE

An emulsified solution containing chlorinated rubber or the like, chlorinated biphenyl, an aromatic hydrocarbon solvent, a wetting agent, an emulsifying agent, and water, which emulsion may be applied to porous material such as concrete after it is dry, before it is dry, or as an ingredient in the integral mix of the concrete, and said emulsion will provide a uniform protective coating over the surface and throughout the concrete or other porous material.

---

The present application is a continuation in part of application Ser. No. 407,916, filed Oct. 30, 1964, and entitled "Material and Method for Treating Concrete" now abandoned.

This invention pertains to a material and method for treating concrete and more specifically to an emulsified solution containing a polymeric compound, such as chlorinated rubber or the like, which may be applied to a porous material such as concrete after it is dry, before it is dry, or as an ingredient in the integral mix of the concrete and said emulsion will provide a uniform protective coating over the surface and throughout the concrete or other porous material.

In prior art materials and methods for treating concrete a solution containing chlorinated rubber or the like is applied to the dry or wet surface of concrete, or other porous material and with the help of wetting and penetrating agents this solution may penetrate through the surface to a relatively shallow depth. However, this penetration is not uniform and, since the application of the solution cannot be uniform, the thickness of the final coating varies. Since the porosity of the concrete may vary it can be seen that in many instances a protective coating applied by means of spraying, brushing, etc. will not be adequate.

A further disadvantage in the prior are materials and methods of coating porous materials such as concrete is the need for additional apparatus to apply the coating. This additional apparatus in many instances is expensive and requires skill to operate.

In the present invention a solution containing a polymeric compound such as chlorinated rubber is emulsified by adding it to a mixture of emulsifying agents and water. The emulsion may then be utilized to treat the porous material by adding it as an ingredient in the integral mix of concrete or other porous material. The mixture of concrete and the emulsion is then applied to the desired form and allowed to cure. Since the basic solution is emulsified in the water of the concrete mix, when the concrete is poured some of the emulsion is forced to the surface by the settling of the solids (aggregate, etc.) in the same manner as water is naturally forced to the surface in concrete. As the concrete cures the water and the solvent evaporate leaving cured concrete which has a protective film on the surface and has the pores throughout filled with protective material. Because the emulsion is added directly to the integral mix the protective coating formed on the concrete surface is uniform and the consistency of the protective coating in the concrete is uniform. Also, since the emulsion is added directly to the integral mix no additional equipment is required and no skill in application is needed.

It is an object of this invention to provide an improved material and method for treating porous material such as concrete.

Another object of this invention is to provide an improved material which may be utilized for producing a uniform protective coating over porous material such as concrete.

Another object of this invention is to provide a method for applying an improved material which does not require additional apparatus and skill in the applicaiton thereof.

These and other objects of this invention will become apparent to those skilled in the art upon consideration of the accompanying specification and claims.

The coating solution which is emulsified in accordance with this invention contains as a basc ingredient an isoprene polymeric compound. It should be understood that while all polymeric compounds might be utilized to form a protective coating over porous material some polymeric compounds are not as desirable because of their properties, for example low wear resistance, low resistance to chemical corrosion, etc. Polymeric compounds suitable for the purpose of the present invention are such compounds as chlorinated rubber, cyclized rubber, rubber hydrochloride, and similar alkali-resistance compounds.

The chlorinated rubber mentioned above may be either chlorinated natural rubber, chlorinated polyolefins, chlorinated vulcanized rubber, or mixtures thereof. Some examples of chlorinated rubber are the products sold under the trademarks Parlon, Parlon S20, Hypalon, Parlon P, and Butyl HT all of which are natural rubbers or polyolefins to which fairly large amounts of chlorine are added (up to 65% or more) in order to modify the properties of the elastomer. Typical amounts of the polymeric compounds utilized in the present chemical system range between approximately 12% to 18% by weight of the total composition. However, it should be understood that the invention is not limited to these values and that these values will vary in accordance with the different uses to which the invention is applied.

Polychlorinated polyphenyl compounds are added to the polymeric compound to perform a variety of functions. While it is possible to produce a thin, transparent sheet from the presently described composition without the use of polychlorinated polyphenyl compounds, it is preferable to add certain of these materials which act as plasticizers, homogenizers or bonding agents. Any such material which is compatible with the polymeric compounds in solution may be employed. Among others, are the following: products sold under the trademark Aroclors (chlorinated biphenyls, chlorinated triphenyls or blends thereof); chlorinated diphenyl ethers; chlorinated napthylene; etc. These materials may be liquids or solids. The liquids and soft solids act as plasticizers, the hard solids as homogenizers, sealers or impregnating agents. All act to increase the adhesive power of the composition.

For example, in the present invention a chlorinated biphenyl is added as a plasticizer. The chlorinated biphenyl comprising an ingredient of the coating compositions in accordance with this invention may be any suitable type, either liquid or solid. By way of illustration the chlorinated biphenyl may be one or another of the various chlorinated biphenyls sold under the trademark Aroclors and may, for example be Aroclor 1254, a liquid, Aroclor 1268, a solid, etc. Typical amounts of the chlorinated biphenyl utilized as a plasticizer in the present chemical system range from about 3.5% to 5.75% by weight of the total composition although these percentages may vary for different applications.

A second example of a polychlorinated polyphenyl compound which may be utilized in the present composition is chlorinated triphenyl. Chlorinated triphenyl is used as a resin fortifier, penetrant, and for increasing the toughness or the bond of the polymeric compound. Examples of chlorinated triphenyl which may be utilized in the present invention are products sold under the trademark Aroclor 5460 or Aroclor 5442. Typical amounts of the chlorinated triphenyl utilized in the present chemical system range from approximately 1.25% to 2.25% by weight of the total composition.

A terpenehydrocarbon is utilized as a wetting, penetrating and as a carrying agent. Examples of typical terpenehydrocarbons which may be utilized in this invention are pine oil, terpentine gum, steam distilled terpentine, etc. Typical amounts of the terpenehydrocarbon utilized in the present chemical system range from approximately 1% to 2% by weight of the total composition.

A minor amount of commercial ultraviolet light and color stabilizer or inhibitor is added to the material in the present chemical system. This stabilizer or inhibitor prevents additional reactions of the chemicals due to light, air, etc., such as oxidation and the like. In general the ultraviolet stabilizer or inhibitor will be a derivative of benzophenone and may be for example an aromatic or diphenyl ketone such as 2-hydroxy-4-methoxy-benzophenone or 3-meth-ocrylate-propoxybenzophenone. Typical amounts of ultraviolet stabilizer or inhibitor utilized in the present chemical system range between approximately 0.25% and 0.75% by weight of the total composition. It should be understood that the ultraviolet stabilizer or inhibitor is added to maintain the desired color of the final product and, if the material is to be utilized where reaction to light is of no concern, the stabilizer may be omitted from the chemical system.

A bonding agent may be added to the above-mentioned ingredients for additional strength and adhesion if desired. The bonding agent increases the adhesion of the protective surface to the porous material. Typical bonding agents are derivatives of glycidal for example an epihalohydrin such as epichlorohydrin. An epihalohydrin utilized in the present chemical system is generally added in amounts ranging from approximately 0.1% to 0.5% by weight of the total composition.

A thermosetting resin stabilizer is added to the chemical system to increase the bonding and adhesive properties thereof and to contribute to the hardness and flexibility thereof. The resin stabilizers that may be utilized in the present system cover a wide and varied range of materials and the specific material utilized will depend largely upon the specific characteristics desired in the final product. In general these resin stabilizers come within three broad catagories: (a) unsaturated acids, for example acrylic, acryl nitrile, methyl acrylate, methyl-γ-methyl acrylate, etc.; (b) polybasic acids or polyester resins, for example alkyd, glyptal, etc.; and (c) epoxy resins, for example 1,2 oxides from tri to hexa hydric alcohols, a group of chemicals sold under the trade name Bakelite epoxy resin of which a typical example is Bakelite 2774, a monomeric, low molecular weight diepoxide, epoxy resin possessing a high proportion of reactive epoxy groups, a viscosity at 25° C. of 11,000–13,500 centipoises, and a weight per epoxide of 180–195 g./g. mole, etc. Typical amounts of the thermosetting resin stabilizer utilized in the present chemical system range from approximately 0.5% to 0.75% by weight of the total composition.

The composition will contain, in addition to the above stated ingredients, a suitable solvent or solvent mixture whereby the essential ingredients will be blended and a solution formed. The solvent or solvent mixture will desirably be of a volatile nature and will act as a vehicle, being wholly or largely removed by, for example, evaporation after application of the composition. The solvent may be of any sutable type for the purpose and must be adapted to the particular polymeric compound to be dissolved. In the present invention it is preferred to make use of the great penetrating powers of the aromatic hydrocarbons, for example xylol, toluol, benzol, etc. In addition the solvent should be a solvent for the other ingredients included in the composition, and will be used in amounts with relation to the ingredients to be dissolved such as to give the viscosity or fluidity desired.

Once the solvent has been added to the other ingredients a solution is formed which may be applied directly to the surface of a porous material such as concrete. However, because the solution as described has an oil base it will not mix with water and therefore cannot be added directly to the wet mix of the porous material since it will simply float on top of the material and the solvent will evaporate at least as fast as the water in the mix. In the present invention an emulsifying agent is added to water and the above-described solution is then added to the mixture of water and emulsifying agent to produce an oil-in-water emulsion. Care must be used to procure an emulsifying agent that will provide a stable emulsion in which the solids or the solution will not settle out after a period of time.

The emulsifying agent utilized in this invention is preferably a nonionic surfactant such as, for example high molecular weight polyethylene glycol derivatives. Typical examples of nonionic surfactants are nonyl phenyl ethylene oxide condensates and alkyl phenyl ether of polyethylene glycol.

As a typical example of the quantity of emulsifying agent required to provide a suitable emulsion the following weights may be utilized. A gallon of the above-described protective coating solution if mixed to have approximately 18% solid in the solution will weigh approximately 7.88 pounds per gallon. A suitable emulsion will be produced if 0.124 pound of emulsifying agent are added to 0.289 pound of water after which 1 gallon of the above solution is added and thorough agitation is performed. If the above described solution is mixed to have approximately 26% solids therein the solution will weigh approximately 8.39 pounds per gallon. A suitable emulsion will be produced from this solution by adding 0.132 pound of emulsifying agent to 0.308 pound of water after which 1 gallon of the 26% solution is added and thorough agitation performed. In both of the above examples it is preferred that a soft or distilled water be utilized although in many cases other water will operate satisfactorily. The emulsion described is stable and may be stored etc. and no settling will occur.

To utilize the described emulsion the desired quantity is simply added as an ingredient of the integral mix of a porous material such as concrete, mortar or terrazzo mixtue and thoroughly mixed with the mixture. The emulsion may be mixed in a concentrated form, substantially as described above, and added to a wet concrete mixture as an additional ingredient or the emulsion may be mixed in a dilute form and added to a dry concrete mixture in lieu of water. In the latter case, the water which is normally added to the concrete mixture is added to the emulsion in advance. The mixture may then be applied to the desired form and allowed to set. As the porous material sets the emulsion will slowly migrate toward the surface and, as the water and solvent evaporate a protective coating having a uniform thickness and depth into the material will remain.

The following are specific examples which further illustrate the invention. Those skilled in the art will readily appreciate that modifications and changes can be made in these examples without departing from the spirit and scope of the invention.

EXAMPLE 1

(1000 gals. of 26% solution)

| | Lbs. |
|---|---|
| Chlorinated rubber (Parlon S20) | 1500 |
| Chlorinated triphenyl (Aroclor 5460) | 180 |
| Chlorinated biphenyl (Aroclor 1254) | 500 |
| Pine oil | 150 |
| Thermosetting resin stabilizer (Bakelite 2774) | 80 |
| Epichlorohydrin | 30 |
| Xylol | 5950 |
| Emulsifying agent (30% solution-alkyl phenyl ether of polyethylene glycol) | 132 |
| Water (soft) | 308 |

EXAMPLE 2

All chemicals and amounts are the same as in Example 1 except the following are substituted for the thermosetting resin stabilizer:

| | Lbs. |
|---|---|
| Thermosetting resin stabilizer (Bakelite 2774) | 45 |
| Ultra violet inhibitor (2-hydroxy-4-methoxy-benzophenone) | 35 |

EXAMPLES 3, 4, and 5

All chemicals and amounts are the same as in Example 1 except for the following substitutions:

180 lbs. of chlorinated rubber (Parlon S20) is substituted for 180 lbs. of chlorinated triphenyl (Aroclor 5460).

80 lbs. of chlorinated rubber (Parlon S20) is substituted for 80 lbs. of thermosetting resin stabilizer (Bakelite 2774).

30 lbs. of chlorinated rubber (Parlon S20) is substituted for 30 lbs. of epichlorohydrin.

It is of course clear to one skilled in the art that the amounts of all of the chemicals could be raised slightly to maintain the percent of solids at a desired level when any one of the chemicals are eliminated as above.

EXAMPLE 6

(1000 gals. of 18% solution)

| | Lbs. |
|---|---|
| Chlorinated rubber (Parlon S20) | 955 |
| Chlorinated triphenyl (Aroclor 5460) | 115 |
| Chlorinated biphenyl (Aroclor 1254) | 320 |
| Pine oil | 96 |
| Thermosetting resin stabilizer (Bakelite 2774) | 51 |
| Epichlorohydrin | 19 |
| Ultra violet inhibitor (2-hydroxy-4-methoxy-benzophenone) | 40 |
| Xylol | 6312 |
| Emulsifying agent (30% solution-alkyl phenyl ether of polyethylene glycol) | 124 |
| Water (soft) | 289 |

EXAMPLES 7, 8, 9, and 10

All chemicals and amounts are the same as in Example 6 except for the following substitutions:

115 lbs. of chlorinated rubber (Parlon S20) is substituted for 115 lbs. of chlorinated triphenyl (Aroclor 5460).

51 lbs. of chlorinated rubber (Parlon S20) is substituted for 51 lbs. of thermosetting resin stabilizer (Bakelite 2774).

19 lbs. of chlorinated rubber (Parlon S20) is substituted for 19 lbs. of epichlorohydrin.

40 lbs. of chlorinated rubber (Parlon S20) is substituted for 40 lbs. of ultra violet inhibitor (2-hydroxy-4-methoxy-benzophenone).

It is of course clear to one skilled in the art that the amounts of all of the chemicals could be raised slightly to maintain the percent of solids at a desired level when any one of the chemicals are eliminated as above.

Thus, a material for treating porous material such as concrete has been described which is easily applied without additional equipment and which provides a uniform protective coating over the porous material.

I claim:

1. An oil-in-water emulsion for adding as an ingredient in the integral mix of concrete to provide a protective coating for the cured product comprising:
    (a) a solution including an isoprene polymeric compound chosen from the group consisting of chlorinated natural rubber, cyclized rubber and rubber hydrochloride present in about 12% to 18% by weight of the total solution, chlorinated biphenyl present in about 3.5% to 5.75% by weight of the total solution, an aromatic hydrocarbon solvent present in about 70% to 84% by weight of the total solution, a wetting agent present in about 1% to 2% by weight of the total solution, chlorinated triphenyl present in about 1.25% to 2.25% by weight of the total solution, a stabilizer chosen from the group consisting of acrylic acid, acryl nitrile, methyl acrylate, polyester resins, and epoxy resins present in about 0.25% to 0.75% by weight of the total solution, epichlorohydrin present in about 0.1% to 0.5% by weight of the total solution, and an ultraviolet inhibitor present in about 0.25% to 0.75% by weight of the total solution;
    (b) an emulsifying agent; and
    (c) water sufficient to produce a desired concentration.

References Cited

UNITED STATES PATENTS

| 2,727,934 | 12/1955 | Brown | 260—3.3 |
| 2,798,056 | 7/1957 | Larson | 260—3.3 |
| 3,240,736 | 3/1966 | Beckwith | 260—29.2 |

MURRAY TILLMAN, Primary Examiner.

M. J. TULLY, Assistant Examiner.

U.S. Cl. X.R.

260—27, 29.7, 31.6, 33.8, 40, 41.5, 836, 873, 879, 735, 737, 734; 117—163